United States Patent [19]
Vesely

[11] 3,808,847
[45] May 7, 1974

[54] BICYCLE LOCK
[76] Inventor: Dwayne G. Vesely, 625 Shelter Creek Ln., San Bruno, Calif. 94066
[22] Filed: Dec. 21, 1972
[21] Appl. No.: 317,221

[52] U.S. Cl.................................. 70/18, 70/56
[51] Int. Cl............................................ E05b 73/00
[58] Field of Search..... 70/14, 15, 18, 54.56, 54.57, 70/58, 225–227, 233–234

[56] References Cited
UNITED STATES PATENTS
2,469,592 5/1949 Byer.................................. 70/15 X
3,101,695 8/1963 Honeyman........................ 70/57 X
3,590,607 7/1971 Beaver................................... 70/56

FOREIGN PATENTS OR APPLICATIONS
726,908 10/1942 Germany.............................. 70/57

Primary Examiner—Robert L. Wolfe
Attorney, Agent, or Firm—Naylor, Neal & Uilkema

[57] ABSTRACT

A lock for bicycles and like portable articles. The lock employs a conventional padlock and includes a casing that encloses the shackle of the padlock to render the shackle inaccessible to hacksaws and/or bolt cutters. A stranded cable having one end permanently attached to the casing and the other end removably attached thereto. Detachment of the latter end is effected by unlocking the padlock so that the body can move relative the casing. A thermally insulative sheath for encasing the cable.

7 Claims, 5 Drawing Figures

PATENTED MAY 7 1974 3,808,847

BICYCLE LOCK

This invention relates to a lock that has an elongate flexible member for locking bicycles, motorcycles, trailers and like portable articles.

Known prior art bicycle locks typically have a degree of strength that is proportional to the weight and expense of the lock structure. In order to resist unauthorized removal of the lock by employment of bolt cutters, it is usual to construct the bicycle lock of stronger and heavier material. Although such construction is successful in improving the security of the lock, the increased weight of the lock structure renders inconvenient the employment of such structures, particularly on lightweight bicycles. The present invention, by way of contrast, provides a bicycle lock that is highly resistant to unauthorized release thereof, but which is extremely lightweight, thereby rendering it suitable for lightweight bicycles and like portable articles.

An object of the present invention is to provide a bicycle lock employing a more or less conventional padlock in which, in the locked position, the shackle of the padlock is inaccessible to bolt cutters, hacksaws, and the like. This object is achieved by providing a high strength casing which totally encloses the padlock shackle when the padlock is in a locked position. The casing can be made of high strength, lightweight steel which is virtually impervious to destruction.

Another object of the present invention is to provide a lock that utilizes high strength airplane cable. Achievement of this object is made possible because the abovementioned casing has sufficient volume therein to receive the ends of the cable and the body of the lock renders inaccessible to cutting tools and the like such ends.

Still another object of the present invention is to provide a lock for bicycles in which the cable is protected against the larcenist's technique of freezing the cable and then fracturing or breaking it. Achievement of this object is possible because the abovementioned aircraft cable is encased by a sheath of suitable thermal insulated material, such as nylon and/or rubber, thereby rendering difficult or impossible the application to the cable of freeze-producing compounds.

A feature and advantage of the abovementioned sheath on the airplane cable is that the overall diameter of the elongate member is increased to a diameter (e.g., 1 inch) that exceeds the maximum jaw opening of typical bolt cutters so that it is impossible to insert the elongate member between the jaws of the bolt cutters.

Yet another object is to provide a bicycle lock in which the locking mechanism is pivotally movable with respect to the elongate member. Achievement of this object permits the locking mechanism to be moved to a conveniently accessible position even though the longate member is formed of relatively stiff stranded cable.

The foregoing, together with other objects, features and advantages, will be more apparent after referring to the following specification and accompanying drawing in which.

Figure 1:
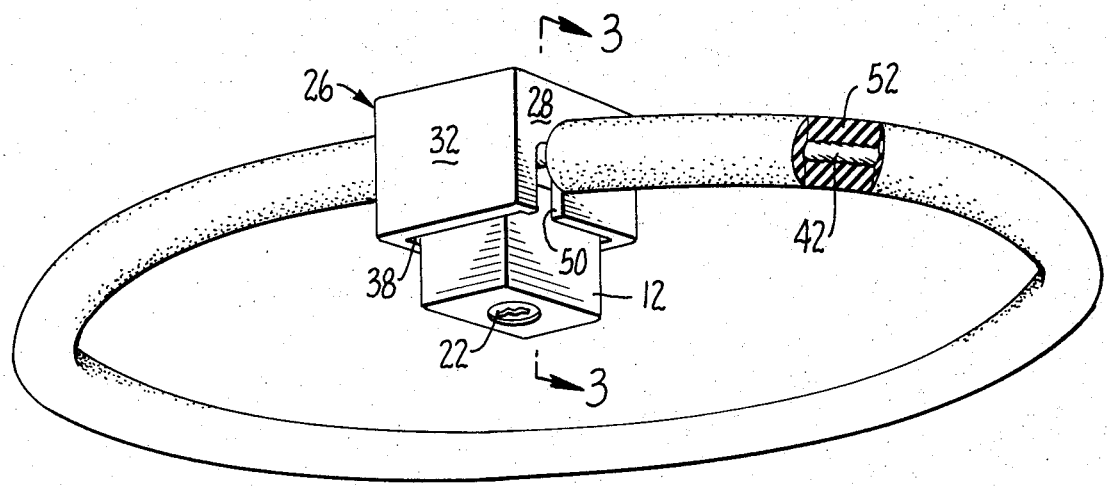
FIG. 1 is a perspective view of a lock according to the present invention shown in a locked position.

Referring more particularly to the drawing, reference numeral 12 indicates the body of a conventional padlock that has a generally U-shaped shackle 14 that extends from one surface 16 of the padlock body. As is conventional, shackle 14 has a relatively long end 18 that projects from surface 16 and is held captive within body 12 and a relatively short end 20 which is movable into and out of an opening in surface 16 when the padlock is locked or unlocked. The lock also includes a suitable means for effecting release of end 20 of shackle 14 when the lock is unlocked, such being indicated in the present embodiment of the invention by a key receiving cylinder 22 configured to receive a key 24. Rotation of key 24 permits movement of body 12 to the position shown by broken lines and indicated at 12′ in FIG. 5.

Figure 5:
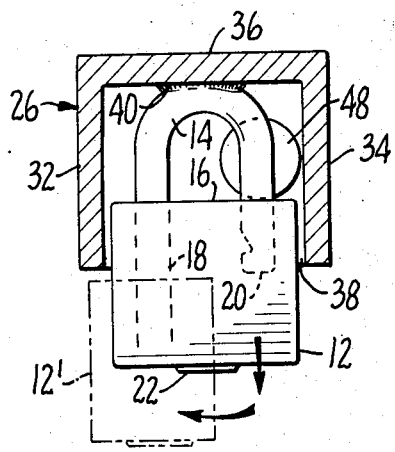

For enclosing and protecting shackle 14, the present invention includes a casing indicated generally at 26. Casing 26 includes sidewalls 28 and 30 and end walls 32 and 34 which are rigidly joined at their respective edges to define an opening having a cross-sectional shape similar to and somewhat larger than the cross-sectional shape of padlock body 12 (See FIG. 4). One end of casing 26 is closed by a cross-plate 36 and the other end is open to define a mouth 38 which affords entry of padlock body 12 to the cavity within the casing. As can be seen in FIGS. 3 and 5, the apex of shackle 14 is rigidly attached as by a weldment 40 to the inner surface of plate 36. The lengths of walls 28, 30, 32 and 34, i.e., the distance from the inner surface of cross-plate 36 to mouth 38, must be great enough, as will be clear from FIG. 5, to permit entry of surface 16 into the cavity when the lock is in the locked position, but not so great as to preclude pivotal movement of padlock body 12 around end 18 of the shackle when the lock is in the unlocked position.

An airplane cable 42 is provided and has a length suitable to lock a bicycle, motorcycle, trailer, or like article. Airplane cable 42 is constructed of any suitable stranded high strength, semi-flexible cable, and in one lock designed according to the present invention is a five-sixteenths twisted strand of cable having such strength that it is virtually impervious to shearing. One end of cable 42 is permanently fastened to wall 30 of casing 26. To achieve this, a hole 44, having a diameter somewhat larger than the outside diameter cable 42, is defined by wall 30. As can be seen most clearly in FIG. 3, hole 44 is relatively close to cross-plate 36. At the end of cable 42, within the cavity of casing 26, there is fastened, such as by swaging, a retainer 46 that is larger than opening 44 so as to prevent movement thereof through the hole. It is preferred that retainer 46 be fastened only to cable 42 so that the cable can rotate with respect to casing 26 to permit the user of the device to position the padlock for access to lock cylinder 22. A similar retainer 48 is provided on the opposite end of cable 42. Wall 28 of casing 26 defines a slot 50.

Figures 2, 4:
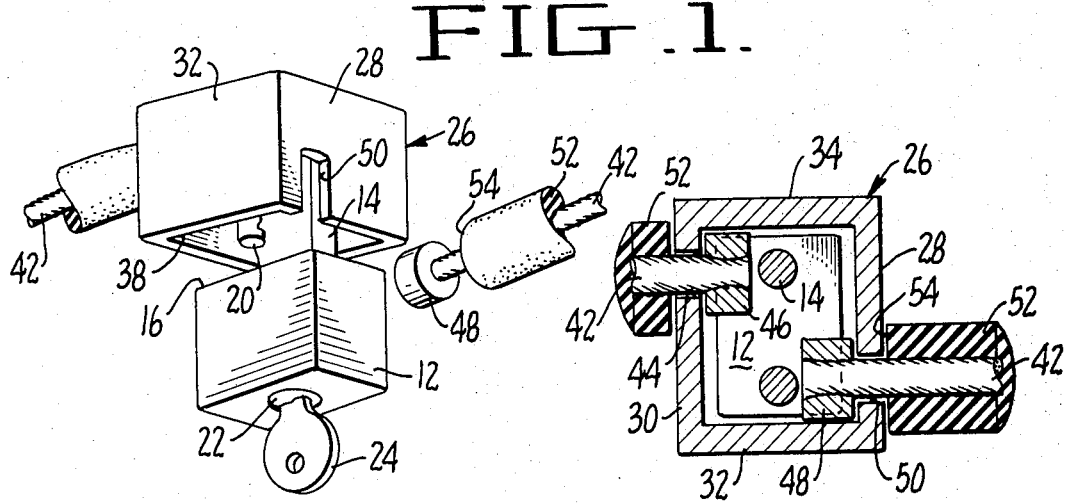
FIG. 2 is a view of a fragment of FIG. 1 showing the lock in an unlocked position.
FIG. 4 is a cross-sectional view taken along the plane designated by line 4—4 of FIG. 3; and, FIG. 5 is a sectional view taken along the plane designated by line 5—5 of FIG. 3.
Figure 3:
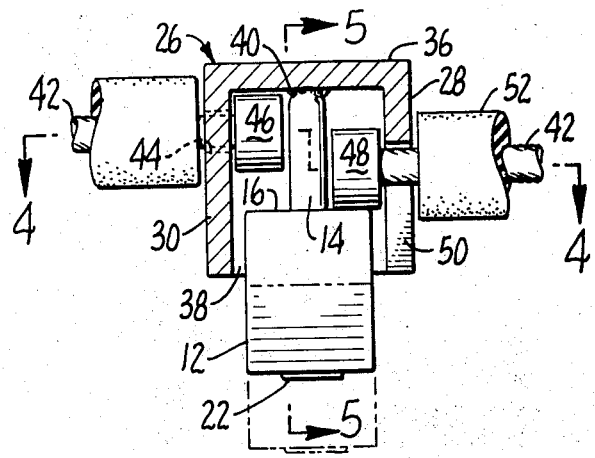
FIG. 3 is a sectional view taken along the plane designated by line 3—3 of FIG. 1.

As can be seen in FIG. 2, slot 50 extends to mouth 38 and has a width greater than the diameter of cable 42 and less than the diameter of retainer 48. Accordingly, when the cable is introduced into slot 50 with retainer 48 within a cavity of casing 26, it can be removed only by moving it within slot 50 toward mouth 38. The inner extent of slot 50 can be appreciated by reference to FIGS. 3 and 5. The inner extent of slot 50 is such that lock body 12 can be moved to the locked position shown in solid lines in such figures without interference from retainer 48 such that surface 16 of padlock body 12 presents an abutment which present removal of retainer 48 and cable 42 from casing 26.

Surrounding and encasing cable 42 is a sheath 52 of suitable material such as rubber or the like. It is preferred to form sheath 52 of uncured rubber and then vulcanize the same onto cable 42; because cable 42 is preferably stranded, it has irregularities which promote a firm bond between the sheath and the cable. It will be noted, as at 54 in FIG. 2, that sheath 52 terminates in spaced apart relation to the retainers on cable 42 so as to permit relative movement between the cable and casing 26.

The operation of the present invention is as follows:

key 24 is inserted into cylinder lock 22 and turned to release end 20 of shackle 14 from padlock body 12 so that the padlock can be moved to the unlocked position designated by broken lines in FIGS. 3 and 5. In the unlocked position, body 12 can be pivoted with respect to shackle 14 so as to afford free access to slot 50. Cable 42 is then passed through the article to be locked, e.g., the spokes of the wheel of a bicycle or motorcycle, and the cable is inserted in slot 50 with retainer 48 within the cavity defined by casing 26. The padlock is then moved to the locked position by rotating body 12 so that the opening in surface 16 is in alignment with end 20 of shackle 14. Body 12 is then moved axially until the mechanism within the padlock engages the shackle and retains the body in the locked position. When the body is in such position, see FIG. 3, surface 16 of lock body 12 presents an abutment which precludes withdrawal of retainer 48 and cable 42 along slot 50. Moreover, in the locked position, shackle 14 is totally encased within casing 26 and is, therefore, not accessible to bolt cutters, hacksaws and the like. The presence of sheath 52 on cable 42 not only prevents damage to finished surfaces, but renders difficult or impossible, because of its size, placement of bolt cutters around the cable. Moreover, the low heat conductivity of the rubber or like material of which sheath 52 is constructed renders impossible freezing and fracturing cable 42. Because the diameter of hole 44 and the width of slot 50 is somewhat in excess of the outer diameter of cable 42, casing 26 can be rotated so that opening 38 is in a downward position, shold the lock be used outside in inclement weather. When it is desired to unlock the lock, the entire casing can be pivoted so that lock cylinder 22 is easily accessible to the user of the device. To release the lock, it is only necessary to insert key 24 into lock cylinder 22 to unlock the padlock and move body 12 outward of mouth 38 and pivot it so as to effect removal of retainer 48 from the interior of the cavity by moving cable 42 through slot 50.

Thus, it will be seen that the present invention provides a lock for articles such as bicycles, motorcycles, trailers and the like which is highly resistent, if not totally impervious to unauthorized opening by employment of hacksaws, bolt cutters, freezing solutions, and the like. These advantageous features are achieved in a relatively light weight structure because the padlock, since its shackle is totally enclosed within casing 26, can be of relatively small and lightweight construction. Moreover, even though cable 42 is of substantial size, cooperative relation with the casing is such that the casing need not be extraordinarily large.

Although one embodiment of the present invention has been shown and described, it will be obvious that other adaptions and modifications can be made without departing from the true spirit and scope of the invention. Accordingly, the invention is not intended to be limited to the specific embodiment herein illustrated and described, but rather is defined by the accompanying claims.

What is claimed is:

1. In combination with a padlock including a body having a surface, a generally U-shaped shackle projecting from said surface and being moveable between a locked position and an unlocked position, and means in said body for effecting selective release of said shackle to the unlocked position, the improvement comprising a casing defining a central opening shaped to receive said body therein, a plate spanning one end of said casing, means for attaching said shackle to said plate so that said shackle and at least said surface of said body reside within said casing when said shackle is in the locked position, said casing having an extent such that said surface is without said casing in the unlocked position, an elongate flexible member having a first end attached to said casing and a second end remote from said first end, an enlargement fixed to said second end, and a portion of said casing defining a slot having a width less than said enlargement and greater than said elongate flexible member, said slot extending to the end of said casing opposite said plate, said slot having an inner extremity such that said enlargement on said elongate member is captured in said slot by said surface when said padlock is in the locked position.

2. A combination according to claim 1 wherein said casing defines a cavity of generally rectangular cross-sectional shape, said padlock body having a similar cross-sectional shape somewhat smaller than said cavity to afford entry of said padlock body into said cavity.

3. A combination according to claim 1 wherein said casing is formed of high strength steel.

4. A combination according to claim 1 wherein said elongate flexible member is constituted by a stranded cable and wherein said casing includes a wall portion defining an opening inward of said surface in the locked position of said padlock, said opening having a diameter greater than said cable, said cable having a first end extending through said opening to the interior of said casing, and a retainer having a cross-sectional dimension greater than said opening rigidly attached to said first end for precluding withdrawal of said cable from said casing and for permitting pivotal movement of said cable relative said casing.

5. A combination according to claim 4 including a sheath of resilient thermally insulative material bonded to and totally encasing said cable.

6. A combination according to claim 5 wherein the outer cross-sectional dimension of said sheath is at least one inch.

7. A combination according to claim 1 wherein said shackle attaching means comprises a weldment between the apex of said shackle and said plate.

* * * * *